US006965775B2

(12) United States Patent
Antoniou et al.

(10) Patent No.: US 6,965,775 B2
(45) Date of Patent: Nov. 15, 2005

(54) SERVICE-ORIENTED PROTECTION SCHEME FOR A RADIO ACCESS NETWORK

(75) Inventors: Zoe Antoniou, Watertown, MA (US); Sudhir Dixit, Weston, MA (US)

(73) Assignee: Nokia Corporation, Espoo (FI)

( * ) Notice: Subject to any disclaimer, the term of this patent is extended or adjusted under 35 U.S.C. 154(b) by 305 days.

(21) Appl. No.: 10/145,655

(22) Filed: May 15, 2002

(65) Prior Publication Data
US 2003/0216141 A1 Nov. 20, 2003

(51) Int. Cl.[7] .......................... H04Q 7/20; H04Q 7/00; H04B 7/00; H04B 1/38; G01R 31/08
(52) U.S. Cl. ...................... 455/450; 455/445; 455/509; 455/512; 455/514; 455/432.3; 455/560; 370/216; 370/217; 370/221; 370/227; 370/329
(58) Field of Search .............................. 455/423, 424, 455/432.3, 433–434, 516–517, 524–525, 554.2, 557, 560, 450, 445, 451, 452.1, 452.2, 453, 509, 512, 513, 514, 561; 370/216, 217, 221, 224, 226, 227, 228, 237, 236.2, 329

(56) References Cited

U.S. PATENT DOCUMENTS

| 5,572,528 | A |   | 11/1996 | Shuen |  |
|---|---|---|---|---|---|
| 5,793,745 | A |   | 8/1998 | Manchester |  |
| 5,818,816 | A | * | 10/1998 | Chikazawa et al. ......... 370/225 |  |
| 6,324,162 | B1 |   | 11/2001 | Chaudhuri |  |
| 6,708,034 | B1 | * | 3/2004 | Sen et al. ..................... 455/445 |  |
| 2002/0114271 | A1 | * | 8/2002 | Happel et al. .............. 370/217 |  |
| 2002/0114305 | A1 | * | 8/2002 | Oyama et al. .............. 370/338 |  |
| 2002/0132611 | A1 | * | 9/2002 | Immonen et al. ........... 455/414 |  |
| 2002/0160811 | A1 | * | 10/2002 | Jannette et al. ............. 455/560 |  |
| 2002/0172148 | A1 | * | 11/2002 | Kim et al. .................. 370/216 |  |
| 2002/0188756 | A1 | * | 12/2002 | Weil et al. .................. 709/240 |  |
| 2003/0134643 | A1 | * | 7/2003 | Pedziwiatr et al. ......... 455/452 |  |
| 2003/0156543 | A1 | * | 8/2003 | Sahinoglu et al. .......... 370/238 |  |
| 2004/0233843 | A1 | * | 11/2004 | Barker ....................... 370/225 |  |

* cited by examiner

Primary Examiner—William Trost
Assistant Examiner—Meless Zewdu
(74) Attorney, Agent, or Firm—Banner & Witcoff, Ltd.

(57) ABSTRACT

The present invention supports a protection path in a radio access network in order to continue communication between terminating nodes of the radio access network if a failure occurs with a communications path between the terminating nodes. A node may assume the functionality of a router, a base transceiver station, or a base station gateway. The establishment of the protection path utilizes the redundancy of connectivity in the radio access network when routing the protection path in accordance with a service protection model. The protection path may be configured with a service protection model that is based on a quality of service model or on a separate protection model. With a quality of service being associated with a traffic class, the service profile indicates the quality of service for different types of services for a user as well as the quality of service that is provided by the protection path if a failure occurs with the communications path.

24 Claims, 5 Drawing Sheets

SERVICE-ORIENTED PROTECTION SCHEME FOR A RADIO ACCESS NETWORK

FIELD OF THE INVENTION

This invention relates generally to a protection scheme for restoring a network path in a radio access network.

BACKGROUND OF THE INVENTION

Both wireless networks and the Internet protocol (IP) networks are extremely important in providing communications. While each type of network is important by itself, both types of networks are synergistic. Consequently, wireless networks and IP networks are merging with the evolution of communications. A wireless network utilizes a radio access network (RAN) in order to communicate with mobile terminals. A radio access network typically comprises base transceiver stations and a corresponding transmission network that interconnects the base transceiver stations. The transmission network enables a communications controller to instruct the base transceiver stations and to transport information to and from the mobile terminals. With the merging of wireless networks and IP networks, IP networks may support the functionality of the transmission network. A radio access network that utilizes IP for interconnectivity is often referred as an IP radio access network (IP-RAN). The IP radio access network is a comprehensive network solution that unifies different radio access technologies and enables ubiquitous third generation services. It may encompasses wideband code division multiple access (WCDMA) radio access network (UTRAN), GSM/EDGE radio access network (GERAN), wireless local area networks (WLAN), broadband radio access networks (BRAN), wireless Intranet office networks, and wireless home networks. The IP radio access network provides a single, cost effective and easily managed transport network linking all radio access networks.

IP networks deployed today are focused primarily on connectivity and typically support only one class of service with a best effort approach. The current IP protocol is connectionless and has an inherent degree of survivability. Dynamic routing protocols are used to react to faults by changing routes when routers learn about topology changes via routing information updates (e.g. link status advertisements). Current routing algorithms are very robust and survivable. However, the recovery time can be significant, on the order of several seconds or minutes, which can cause service disruption and loss of quality of service (QoS). This can be unacceptable for the IP radio access network, especially if its transport layer is connection-oriented which is more vulnerable to faults.

There are various factors that necessitate a protection/restoration scheme in the IP radio access network. First, Layer 3 (e.g. IP) rerouting may be too slow for radio access networks that need to support high reliability and availability. Second, physical and link layer protection mechanisms may not be deployed in topologies that meet carrier's protection goals. Third, the granularity at which the lower layers (typically at first and second layers, corresponding to the physical layer and the link layer, respectively) are able to protect traffic may be too coarse for the traffic requirements. Physical and link layer mechanisms have no visibility into higher layer operations. Thus, while physical and link layer mechanisms provide link protection, the mechanisms cannot provide node or traffic class protection. Fourth, the recovery approach of a connectionless network has several undesirable attributes. For instance, a forwarding path for recovery can be affected by the transient instability of dynamic shortest path first routing when failures occur. In practice fault restoration capabilities can be implemented in multiple protocol layers such as automatic protection switching in the physical layer, self-healing in the ATM layer and fast rerouting in the Internet protocol/multiprotocol label switching (IP/MPLS) layer. Usually, fault recovery is attempted first in the lower layers and escalated to higher layers if recovery is not possible.

Prior art protection options in the radio access network are limited. Protection schemes (if available) are based on lower layer protection mechanisms and dependent on the technology used in these layers. Moreover, protection schemes often utilize 100% redundancy in order that a network merely switches to the redundant facilities when a fault is detected.

Thus, there is a need to enable an IP radio access network to quickly recover from network failures. The recovery should be consistent with a grade of service that is associated with the effected wireless user and should provide protection on an economical basis.

SUMMARY OF THE INVENTION

The aspects of the present invention support a protection path in a radio access network in order to continue communication between termination nodes of the radio access network if a failure occurs with a communications path between the terminating nodes. A node may assume the functionality of a router, a base transceiver station, or a base station gateway. The establishment of the protection path utilizes a redundancy of connectivity in the radio access network when routing the protection path in accordance with a service protection model. An aspect of the invention provides a method for configuring the network redundancy in the radio access network.

In a first embodiment, the protection path is configured with a service protection model that is based on a quality of service model. A quality of service is associated with a traffic class (that may be associated with real time applications, non-real time applications, and with background applications). A service profile indicates the quality of service for different types of services for a user. Further, the service profile indicates the quality of service that is provided by the protection path if a failure occurs with the communications path. The detection and the transferring from the communications path to the protection path is typically associated with software that is associated with a layer greater than layer 3, e.g. multiprotocol label switching (MPLS) with the Internet protocol. A lower layer may detect a failure and signal the occurrence to a higher layer. Variations of the embodiment may establish the protection path before a failure of the communications path occurs. Other variations may establish the protection path after the failure.

In a second embodiment, the service protection model is based upon a separate protection model, in which a protection class (e.g. a platinum class or a bronze class) is indicative of the associated service protection that a user has if the user is assigned the protection class.

In the embodiments, network management functionality may be centrally provided by a network element such as an operations, administration, and maintenance server. The server stores service profiles for different customers. The server exchanges signaling messages with the associated nodes in the radio access network in order to configure a protection class. In a variation of the embodiments, the network management functionality is distributed among a plurality of nodes within the radio access network.

DETAILED DESCRIPTION OF THE INVENTION

Figure 1:
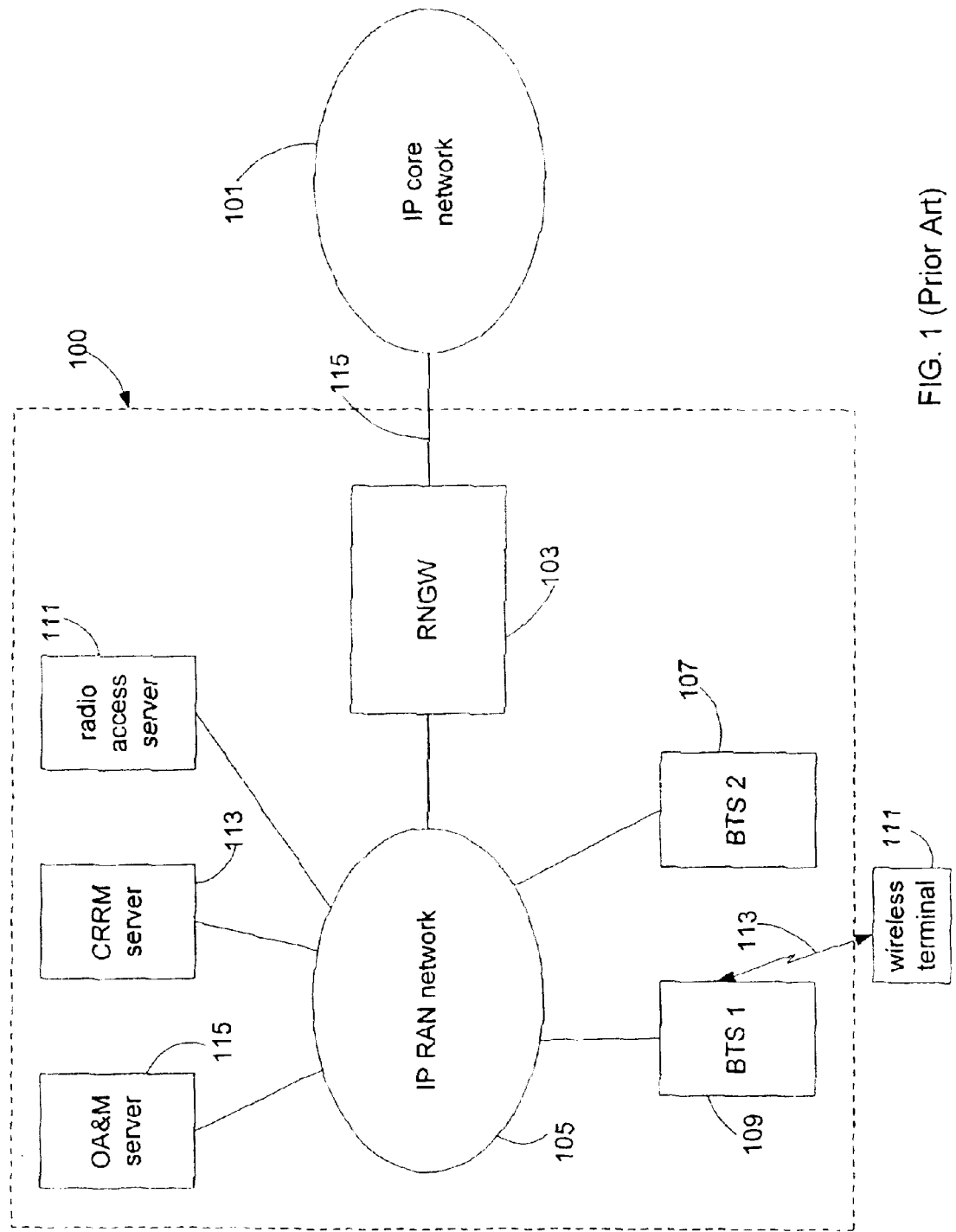
FIG. 1 shows an architecture of a radio access network according to prior art.

FIG. 1 shows an architecture of a radio access network 100 according to prior art. Radio access network (RAN) 100 may serve a plurality of wireless terminals (e.g. a wireless terminal 111) over a wireless channel (e.g. a channel 113) in a wireless network through base transceiver stations (BTSs), e.g. base transceiver stations 107 and 109. Base transceiver stations 107 and 109 may support one or more radio access technologies such as global mobile service (GSM), time division multiple access (TDMA), code division multiple access, and wireless local access networks (e.g. International Electrical and Electronics Engineers Standard 802.11).

Radio access network 100 interfaces to an Internet protocol (IP) core network 101 through a radio access gateway (RNGW) 103. IP core network 101 may support IP version 4 or IP version 6. A radio access gateway 103 may interface to IP core network 101 through an Iu-PS interface 115 (as specified in Universal Mobile Telecommunications System or General Packet Radio Service). A terminal that is connected to IP core network 101 may communicate to wireless terminal 111 utilizing packets that traverse through interface 115, radio access gateway 103, an IP radio RAN network 105, base transceiver station 109, and wireless channel 113.

IP radio RAN network 105 transports packets to different nodes that are associated with radio access network 100, including base transceiver stations 107 and 109, radio access network gateway 103, a radio access server 111, a common radio resource manager 113, a radio access server 111, and an operations, administration, and maintenance (OA&M) server 115. Common radio resource manager 113 assigns traffic to a radio bearer that is associated with base transceiver station 107 or 109. Radio access server generates necessary signaling messages that are associated with a call involving wireless terminal 111. Operations, administration, and maintenance server 115 enables a service provider to provision, configure, and maintain radio access network 100. With the architecture shown in FIG. 1, both IP core network 101 and radio access network 100 support the Internet protocol, thus facilitating the transport of IP packets.

Figure 2:
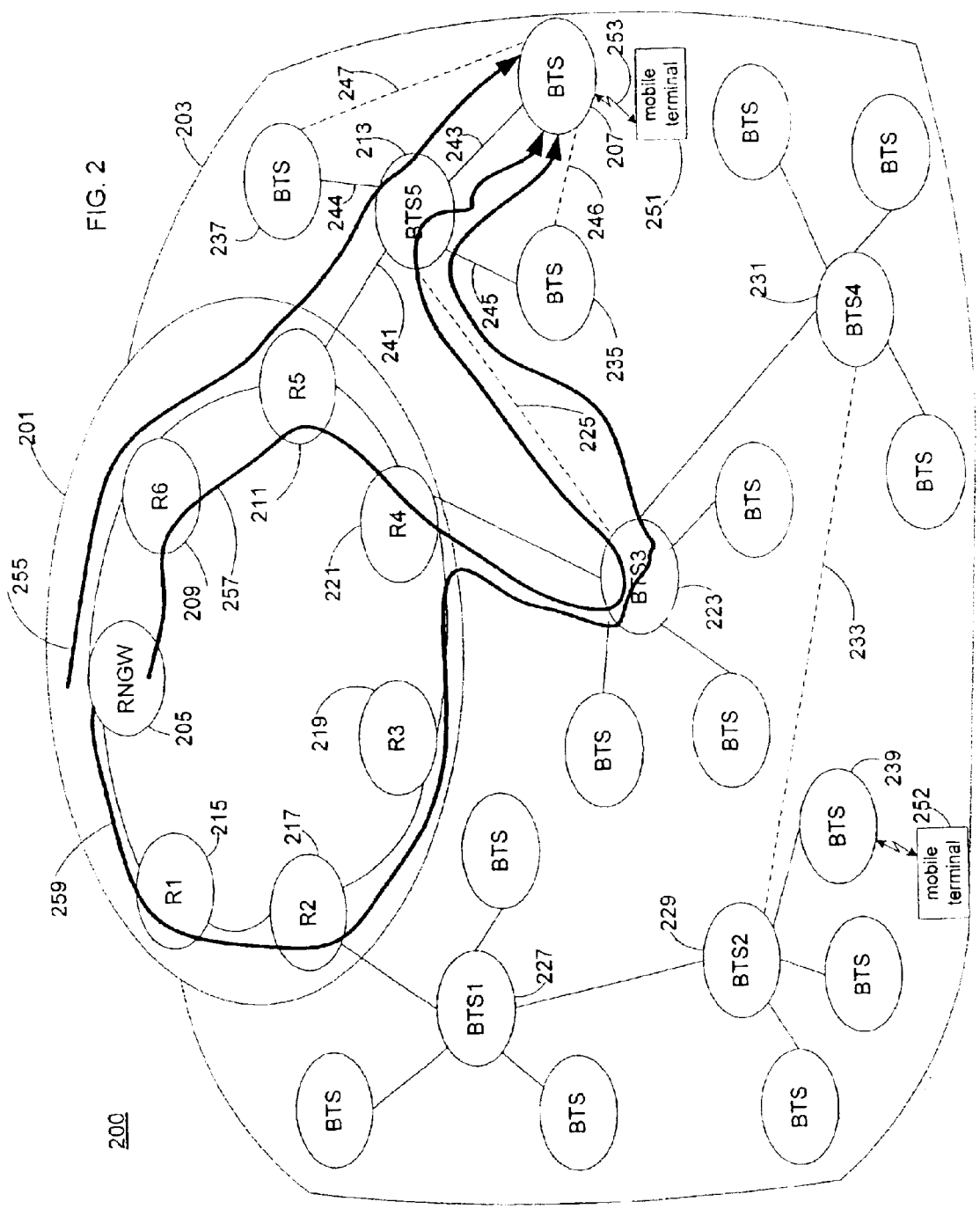
FIG. 2 shows an architecture of a radio access network according to an embodiment of the invention.

FIG. 2 shows an architecture of radio access network 200 in accordance with an embodiment of the invention. Radio access network 200 is partitioned into a central region 201 and an outer region 203. In the embodiment of the invention, a node in radio access network 200 may be a router or a base transceiver station. Other embodiments may incorporate other types of transmission entities as nodes. Central region 201 may be a regional network with a fiber ring such as a ring connecting a radio access gateway (RNGW) 205, and routers (R1,R2,R3,R4,R5,R6) 215, 217, 219, 221, 211, and 209, respectively. (Variations of the embodiment may utilize a plurality of rings.) However, with other embodiments central region 201 may be expanded towards outer region 203. (For example, central region 201 may be expanded by adding a fiber ring to connect a group of base transceiver stations.) Central region 201 typically supports a greater transmission redundancy than outer region 203. For example, the fiber ring connecting nodes 205, 209, 211, 221, 219, 217, and 215 may have a capability of routing in both a clockwise and a counter-clockwise direction, thus providing protection if a facility between routers on the fiber ring fails. In such a case, an alternative path in the opposite direction may be configured so that communication between termination nodes may continue.

The service provider does not typically support as great a transmission redundancy in outer region 203 as with central region 201. Outer region 203 comprises a plurality of nodes. In the embodiment, base transceiver stations (BTSs) are organized in clusters of stars in which transmission facilities emanate from key nodes (e.g. base transceiver stations 213, 223, 227, 229, and 231). Other embodiments may utilize stars, trees, chains, or a combination of nodes within corresponding network topologies. Secondary nodes (e.g. base transceiver stations 235, 237, 207, and 239) are connected to corresponding key nodes.

FIG. 2 shows a mobile terminal 251 connected to base transceiver station 207 over a wireless channel 253 in order to communicate with another terminal connected to an IP core network (e.g. 101) through radio access network gateway 205. A communications path 255 is established through router 209, router 211, base transceiver station 213, and base transceiver station 207 (which serves mobile terminal 251). Router 211 is connected to base transceiver station 213 through a link 241 corresponding to communications path 255. The embodiment may also support a communications path between two terminating nodes in order support communication between mobile terminal 251 and a mobile terminal 252, both mobile terminals 251 and 252 being served by radio access network 200. For such a case, the inclusion of radio network gateway 205 (in order to gain access to an IP core network) in a communications path may not be necessary.

Assuming no transmission failures, communications path 255 supports a quality of service (QoS) that corresponds to mobile terminal 251. The quality of service describes a grade of service that is provided to mobile terminal 251 and may be predicated by a traffic class. Quality of service may encompass time delay, bandwidth, rates, and other transmission parameters. Different levels of quality of service may be associated with different traffic classes. For example, a low time delay and a low error rate may be associated with real time applications. However, non-real time applications may tolerate a higher time delay and a higher error rate. An association of different users (e.g. mobile terminal 251 and 252) and a required quality of service for different traffic classes may be maintained in a data structure for a user or a class of users.

The embodiment shown in FIG. 2 may support a protection path, which functions as an alternative path if communications path 255 cannot be maintained. For example, if link 241 (which connects router 211 with base transceiver station 213) fails, then transmission over communications path 255 may fail or may be significantly degraded. The embodiment of the invention provides additional links in a mesh configuration of radio access network 200 in order that a protection path (e.g. a protection path 257 or 259) may be established if communications path 255 has a failure of a link or a node. In the embodiment, connectivity between base transceiver station 223 and base transceiver station 213 is provided with a link 225. Protection path 257 and 259 spans at least a sub-path that is disjoint with respect to communications path 255.

The embodiment utilizes protection path 257 that spans radio access network gateway 205, router 209, router 211, router 221, base transceiver station 223, base transceiver station 213, and base transceiver station 207. In the embodiment, the ring in central region 201 provides lower layer protection (layer 1 and or layer 2) and has sufficient capacity and connectivity to provide reliable transmission in the case of a transmission failure. However, if reliability of the ring and routers 209 and 211 in central region 201 is not sufficient, then a variation of the embodiment may utilize protection path 259 that spans radio access network gateway 205, router 215, router 217, router 219, router 221, base transceiver station 223, base transceiver station 213, and base transceiver station 207.

In the embodiment shown in FIG. 2, key nodes may be interconnected in order to provide an underlying network topology in which a protection path that is disjoint from the communications path from radio access network gateway 205 to a last hop may be configured. For example, communications path 255 is disjoint from protection path 259 except for a link 243 (which corresponds to the last hop before wireless channel 253). Other protection paths (e.g. protection path 257) may have a lesser degree of disjointedness, depending upon the underlying reliability of the network topology. For example, protection path 257 has commonality with communications path 255 with respect to routers 209 and 211 and last hop link 243.

The embodiment supports protection paths in which even the last hop link is disjoint from the last hop link of the communication path. In a variation of the embodiment, base transceiver station 235 and base transceiver station 207 are interconnected with a link 246, while base transceiver station 237 and base transceiver station 207 are interconnected with a link 247. Links 246 and 247 may be microwave transmission links. With the added connectivity, protection path 259 may be altered in which the path is routed through base transceiver station 235 and link 246, as an example.

Protection path 257 or 259 may be established before a communications failure of communications path 255 or after a communications failure of communications path 255. (In some embodiments, a protection path may be shared with a plurality of communications paths. Also a communications path may be split among a plurality of protection paths.) If protection path 257 or 259 is established after a communications failure, a setup time may be required so that transmission between termination nodes may be disrupted until the establishment has been completed. If protection path 257 or 259 is established after a communications failure, protection path 257 or 259 may be used exclusively with communications path 255 or may be used to transport low priority, pre-emptible traffic during failure-free conditions.

With the embodiment that is shown in FIG. 2, connectivity between key nodes at different levels may be provided in order to obtain a protection path that may be disjoint with a communications path (e.g. path 255) except for a last hop link. In the embodiment, the level that is associated with a key node is equal to the number of hops from central region 201. Base transceiver stations 227, 223, and 213 correspond to a first level, while base transceiver stations 229 and 231 correspond to a second level. In the embodiment, as shown in FIG. 2, link 225 is provided to support protection paths 257 and 259 in a case that link 241 fails. Also, links between base transceiver station 227 and base transceiver station 223 and between base transceiver station 229 and base transceiver station 213 may be incorporated to support additional protection paths corresponding to the first level. Protection paths for base transceiver stations at the second level may be provided by adding a link 233 between base transceiver station 229 and base transceiver station 231.

Figure 3:
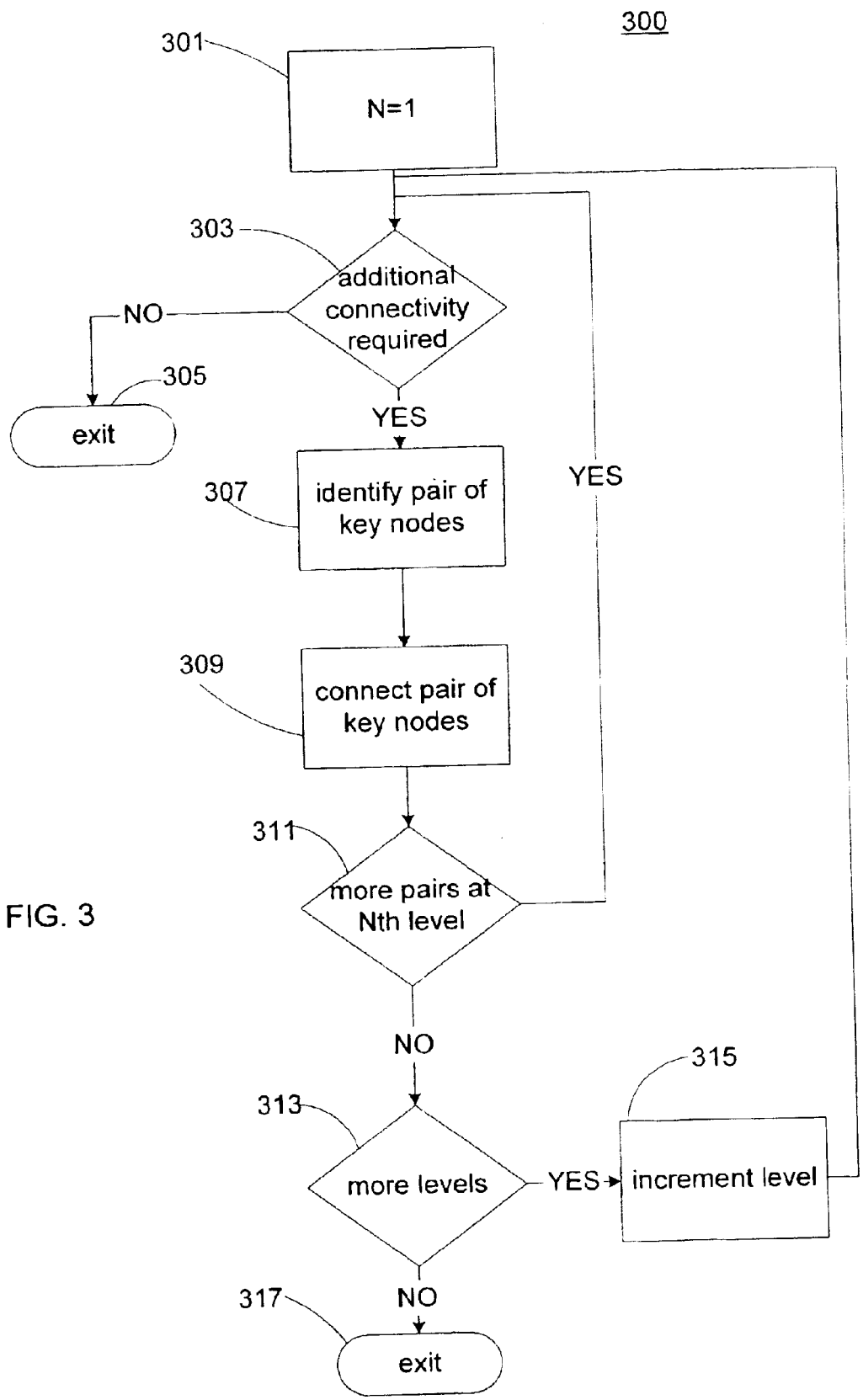
FIG. 3 shows a procedure for enhancing connectivity in a radio access network in order to provide a protection path.

FIG. 3 shows a procedure 300 for enhancing connectivity in radio access network 200 in order to provide a protection path. In step 301, procedure 300 is initialized to analyze the topology of radio access network 200 at the first level. In step 303, procedure 300 determines if additional connectivity is required in order to support additional protection paths. The determination may be dependent upon a required reliability of a portion of radio access network 200 that is being analyzed. If procedure 300 determines that the network connectivity is adequate, procedure 300 is exited in step 305. In step 307, the corresponding key nodes are identified, and connectivity between the identified pair of key nodes is provided in step 309. (A key node may include a central node of a star cluster or a root node of a tree cluster.) Step 311 determines if more pairs of nodes at the given level shall be considered. If so, steps 303–309 are repeated. If not, step 313 determines if radio access network 200 supports additional levels of key nodes. For example, in the embodiment as shown in FIG. 2, two levels are supported. If more levels are supported, the level is incremented in step 315, and steps 303–311 are repeated in order to obtain additional protection paths as required.

In the embodiment, different users (e.g. mobile terminal 251 and 252) may have different service profiles. Service-oriented protection provides a policy-based protection to traffic flows. Service-oriented protection may guarantee selected requirements for traffic flows and may differentiate in the protection of applications, protection classes, and users in order to better use available resources when complete redundancy (i.e. 100% redundancy) is not available. The service profile determines the required quality of service (QoS) for the various traffic classes during normal working conditions (i.e. when the corresponding communications path is being used), as well as the reliability and quality of service of the protection path in the case that the communications path has failed. Some traffic classes/users may be protected with the same quality of service guarantees corresponding to communication paths while other traffic classes/users may have a limited quality of service. Some traffic classes/users may be protected while others dropped. Different traffic classes/users can be protected through different protection paths established in different ways (e.g. protection path setup in advance or on demand) which can affect the failover times. Users can be categorized between corporate, small business, high density commercial center (airports, bus/train terminals), campuses, residential and so forth. Protection can be provided based on each user's service category.

In the embodiment, the protection service model may have two different forms as shown in Table 1 and Table 2, in which a service profile is expanded to support a case in which communications path 255 fails and operations are transferred to protection path 257.

With Table 1, the protection service model maps a set of service protection characteristics with a quality of service that is associated with operations on the communications paths The quality of service is typically associated with a traffic class. For example, with real time applications, the quality of service is typically characterized by a relatively small delay time. With the protection service model shown in Table 1, if a failure occurs on the communications path (e.g. path 255), the protection path (e.g. 257 or 259) provides an equivalent quality of service as with the communications path, in which the protection path is configured before a failure on the communications path. Thus, the failover time, i.e. the time to transfer from the communications path to the protection path is relatively fast (as compared to other levels of quality of service). Also, real time applications are typically associated with the highest retention priority. The protection service model as shown in Table 1 also supports a set of service protection characteristics that are associated with non-real time applications, background applications, and best effort. Other embodiments may utilize different actions with respect to the actions that are shown in the column entitled "associated service protection" of Table 1.

TABLE 1

PROTECTION SERVICE MODEL WITH QoS MODEL

| QoS | Associated Service Protection |
| --- | --- |
| Real Time (RT) | Equivalent QoS |
| | Predefined path |
| | Fastest failover time |
| | Highest retention priority |
| Non-Real Time (NRT) | Equivalent QoS |
| | Predefined path |
| | Fast failover time |
| | Medium retention priority |
| Background | Limit QoS |
| | Path on demand |
| | Slower failover time |
| | Lowest retention priority |
| Best Effort | Drop traffic |

Table 2 shows a protection service model that is based upon protection classes with a separate protection service model. Customers that are associated with the platinum class have the same quality of service on protection path 247 as with communications path 255, in which protection path 257 is predefined, i.e. protection path 257 is configured before a failure with communications path 255. On the other hand, customers that are associated with the bronze class, have a limited quality of service on protection path 257 with protection on-demand, i.e. protection path 257 is configured after a failure with communications path 255. Other embodiments may utilize different actions with respect to the actions that are shown in the column entitled "associated service protection" of Table 2.

TABLE 2

PROTECTION SERVICE MODEL WITH SEPARATE
PROTECTION SERVICE MODEL

| Protection Class | Associated Service Protection |
| --- | --- |
| Platinum | Equivalent QoS |
| | Predefined path |
| | Fastest failover time |
| | Highest retention priority |
| Premium | Limited QoS |
| | Predefined path |
| | Fast failover time |
| | Medium retention priority |
| Bronze | Limited QoS |
| | Path on-demand |
| | Slower failover time |
| | Lowest retention priority |
| None | Drop traffic |

Figure 4:
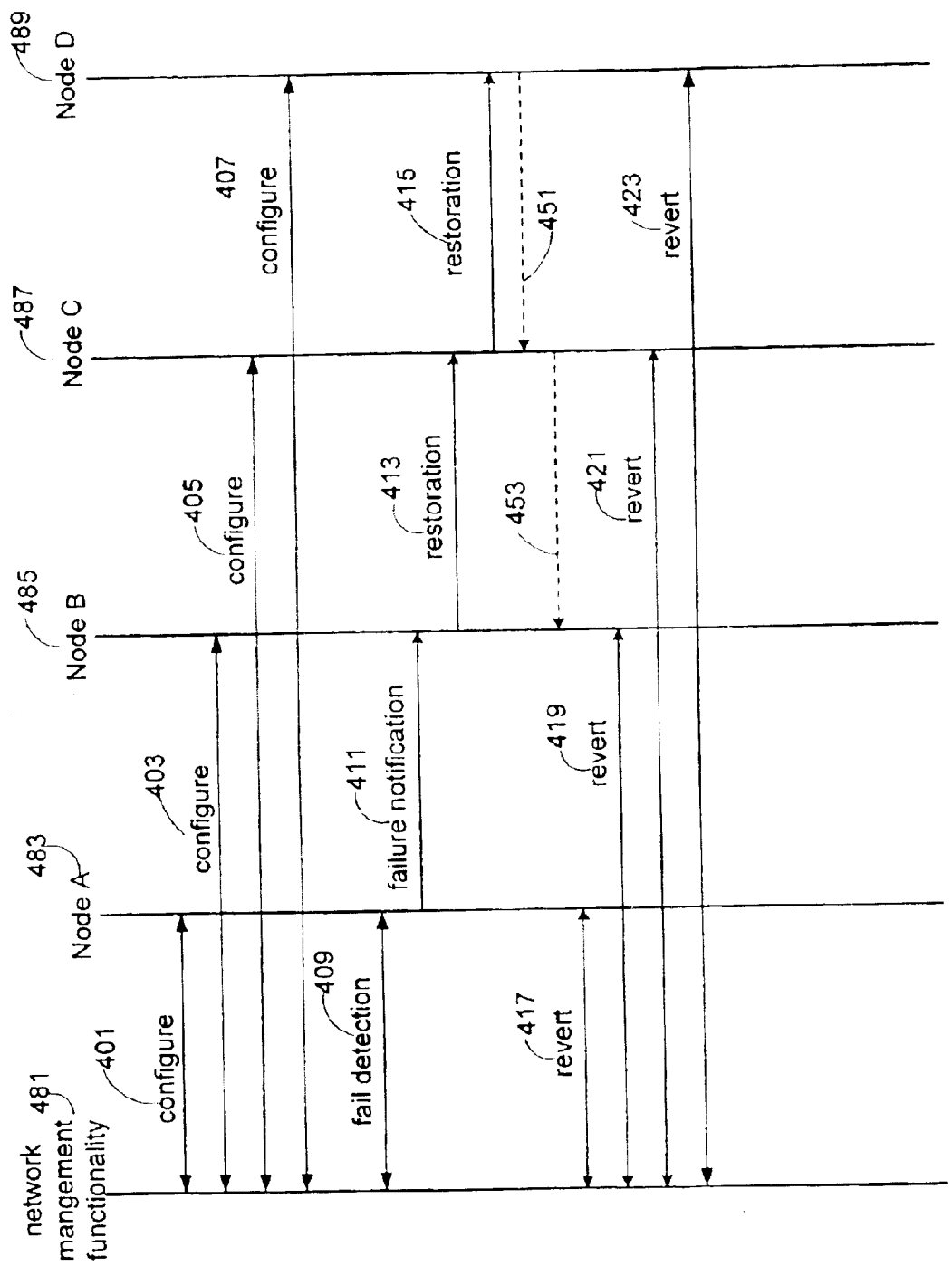
FIG. 4 shows a message flow for establishing a protection path according to an embodiment of the invention.

FIG. 4 shows a message flow for establishing protection path 257 or 259 according to an embodiment of the invention. With messages 401, 403, 405, and 407, a network management functionality 481 informs a node 483, a node 485, a node 487, and a node 489 about establishing protection path 257 or 259 in accordance with a service profile that is associated with mobile terminal 251. (Other embodiments may periodically reconfigure protection paths 257 or 259 based upon updated information about network topology, service profiles, and the protection service model.) Some of the nodes (e.g. 485, 487, or 489) may not be associated with communications path 255 in order to configure protection path 257 or 259 that is at least partially disjoint with communications path 255. In the embodiment, messages 401, 403, 405, and 407 may be signaling messages encapsulated in IP packets. Messages 401, 403, 405, and 407 may also include other information including a network-topology of radio access network 200 and quality of service policies. In the embodiment, network management functionality 481 resides at a single network element (e.g. operations, administration, and maintenance server 115). With other embodiments, network management functionality 481 may be distributed among nodes 483, 485, 487, and 489. Nodes 483, 485, 487, and 489 may correspond to transmission entities, including a radio access network gateway (e.g. 205), a router (e.g. router 215), or a base transceiver station (e.g. base transceiver station 213 or base transceiver station 207). In cases in which a plurality of base transceiver stations interconnect at a central base transceiver station (e.g. base transceiver station 213), the central base transceiver station may be referred as a base station gateway (BSGW). In some embodiments, protection path 257 or 259 may be established before an occurrence of a failure with communications path 255.

Upon the detection of a failure of communications path 255 (e.g. a link between node 483 and another node supporting communications path 255 fails) a detecting node (e.g. node 483) reports about the occurrence to network management functionality 481 with a failure detection message 409. In other embodiments, if network management functionality 481 does not reside in a single entity (such as server 115), message 409 may not need to be explicitly sent but may correspond to an internal message within node 483.

Upon failure detection, node 483 notifies node 485 about the failure in order to initiate a restoration procedure with a failure notification message 411. Consequently, node 485 sends restoration message 413 to node 487, and node 487 sends restoration message 415 to node 489. The embodiment may utilize multiprotocol label switching (MPLS) in conjunction with IP in order to configure protection path 257 or 259 using a label-switched path (LSP); however, other embodiments (which may utilize MPLS) may configure protection path 257 or 259 before the occurrence of the failure, such as in conjunction with messages 401—407. In the embodiment, an MPLS label, which contains next-hop information, is added to an IP packet. Correspondingly, the embodiment may utilize resource reservation protocol (RSVP) signaling (such as specified in "Resource ReSerVation Protocol—Version 1 Functional Specification," Internet Engineering Task Force RFC 2205), in which messages 413 and 415 correspond to PATH messages and messages 451 and 453 correspond to RESV messages. Alternatively, the embodiment may utilize constraint routed-label distribution protocol signaling (such as specified in "Constraint-Based LSP Setup Using LDP," Internet Engineering Task Force draft-ietf-mpls-cr-1dp-02.txt, August 1999). Other embodiments may utilize other technologies in configuring protection path 257 or 259, including differentiated services (DiffServ such as described in "Definition of the Differentiated Services Field in IPv4 and IPv6 Headers," Internet Engineering Task Force RFC 2474), a combination of DiffServ and MPLS, and asynchronous transfer mode (ATM).

If communications path 255 becomes functional subsequently, communications may revert back to communications path 255 from protection path 257 or 259. In such a case, network management functionality 481 sends revert messages 417, 419, 421, and 423 to nodes 483, 485, 487, and 489, respectively. Resource reservation protocol signaling may be used in such a case.

Figure 5:
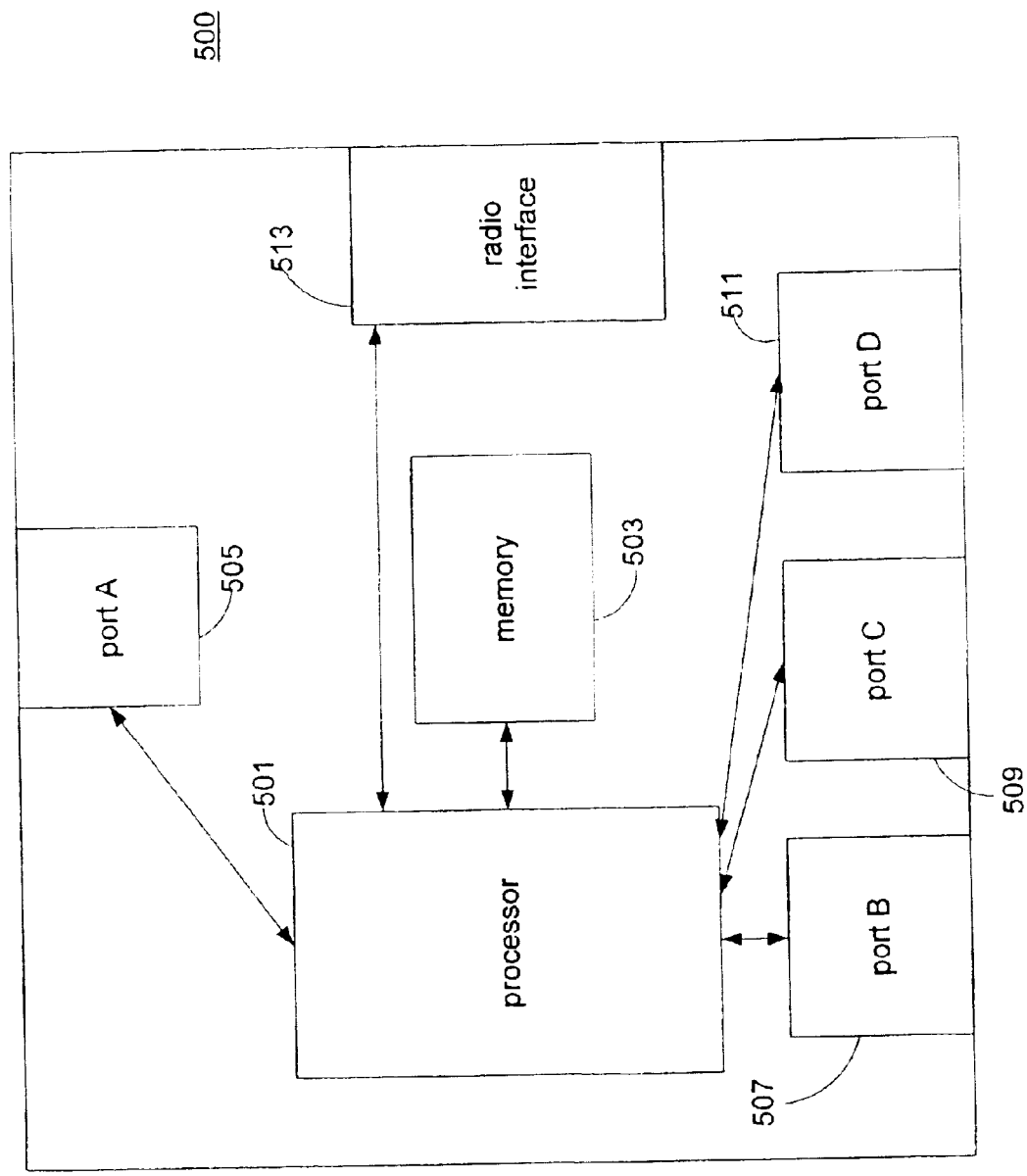
FIG. 5 shows an architecture of a node according to an embodiment of the present invention.

FIG. 5 shows an architecture of a node 500 according to an embodiment of the present invention. Node 500 may correspond to radio access network gateway 205, a router (e.g. router 209), or base transceiver station (e.g. base transceiver station 213 or base transceiver station 207). Node 500 comprises a processor 501, a memory 503, a port 505, and a port 507. If additional routing capabilities are needed, additional ports 509 and 511 may be supported. Ports 505–511 are used to direct packets between different nodes. For example, base transceiver station may communicate with router 211 through port 505, communicate with base transceiver station 235 through port 507, communicate with base transceiver station 211 through port 509, and communicate with base transceiver station 237 through port 511. Also, a base transceiver station (e.g. 209) may serve mobile terminal 251 over a wireless channel (e.g. 253). In such a case, a radio interface 513 is supported. Processor 501 executes a software program from memory 503 in accordance with the message flow shown in FIGS. 4 in order to support radio access network 200. If network management functionality is distributed with radio access network 200, memory 503 may store the service profile of mobile terminal 251.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A first node for supporting communications to a mobile terminal in a radio access network, the first node comprising:
    a port; and
    a processor connected to the port in order to exchange packets with a second node, the processor configured to cause the first node to perform the steps of:
        (a) configuring a first protection path between the first node and the second node based upon a service profile, wherein the second node serves the mobile terminal, further comprising the steps of:
            (i) accessing the service profile that is associated with the mobile terminal; and
            (ii) establishing the first protection path in accordance with the service profile;
        (b) determining that the communications shall be transferred from a first communications path to the first protection path; and
        (c) transferring the communications from the first communications path to the first protection path.

2. The first node of claim 1, wherein the first node is a radio access network gateway.

3. The first node of claim 1, wherein the second node is a base transceiver station.

4. The first node of claim 1, wherein the processor is configured to perform the further step of:
    (d) reverting the communications from the first protection path to the first communications path.

5. The first node of claim 4, wherein step (d) comprises the steps of:
    (i) determining that the communications shall be transferred from the first protection path to the first communications path; and
    (ii) transferring the communications from the first protection path to the first communications path.

6. The first node of claim 1, wherein steps (a)–(c) utilize a protocol corresponding to a layer that is higher than layer 2.

7. The first node of claim 1, wherein characteristics of the service profile are selected from the group consisting of a quality of service, a failover time, and a retention priority.

8. The first node of claim 1, wherein the first protection path is configured before a failure occurrence of the first communications path.

9. The first node of claim 8, wherein the first protection path is used to transport pre-emptible traffic if the communications is not transferred from the first communications path to the first protection path.

10. The first node of claim 1, wherein the first protection path is configured after a failure occurrence of the first communications path.

11. The first node of claim 1, wherein the first protection path is associated with the first communications path and a second communications path.

12. The first node of claim 1, wherein the first protection path and a second protection path are associated with the first communications path.

13. The first node of claim 1, wherein step (i) comprises the step of:
    (1) querying a network management functionality for the service profile.

14. The first node of claim 1, wherein the service profile is based upon a quality of service that is associated with the first protection path.

15. The first node of claim 1, wherein the service profile is based upon a separate service protection model.

16. The first node of claim 1, wherein the processor is configured to perform the further step of:
    (d) periodically determining the first protection path based upon information that is selected from the group consisting of a network topology of the radio access network, a service profile, and a protection service model.

17. The first node of claim 16, wherein step (d) comprises the step of:
    (i) querying a network management functionality for the service profile.

18. A method for supporting communications between a first node and a mobile terminal in a radio access network, the method comprising the steps of:
    (a) configuring a first protection path between the first node and a second node, wherein the second node serves the mobile terminal, further comprising the steps of:

(i) accessing a service profile that is associated with the mobile terminal; and (ii) establishing the first protection path in accordance with the service profile;

(b) determining that the communications shall be transferred from a first communications path to the first protection path; and (c) transferring the communications from the first communications path to the first protection path.

19. The method of claim 18, further comprising the step of:

(d) reverting the communications from the first protection path to the first communications path.

20. The method of claim 19, wherein step (d) comprises the steps of:

(i) determining that the communications shall be transferred from the first protection path to the first communications path; and (ii) transferring the communication from the first protection path to the first communications path.

21. The method of claim 18, wherein step (i) comprises the step of:

(1) querying a network management functionality for the service profile.

22. The method of claim 18, further comprising the step of:

(d) periodically determining the first protection path based upon information that is selected from the group consisting of a network topology of the radio access network, a service profile, and a protection service model.

23. A computer-readable medium containing instructions for supporting communications between a first node and a mobile terminal in a radio access network, comprising instructions that cause the first node to perform the steps of (a) configuring a first protection path between the first node and a second node, wherein the second node serves the mobile terminal further comprising the steps of:

(i) accessing a service profile that is associated with the mobile terminal; and (ii) establishing the first protection path in accordance with the service profile;

(b) determining that the communications shall be transferred from a first communications path to the first protection path; and (c) transferring the communications from the first communications path to the first protection path.

24. A method for supporting communications between a first node and a mobile terminal in a radio access network, the method comprising the steps of:

(a) accessing a service profile that is associated with the mobile terminal, wherein the service profile is in accordance with a service protection model;

(b) establishing a protection path in accordance with the service profile;

(c) determining that the communications shall be transferred from a communications path to the protection path; and (d) transferring the communications from the communications path to the protection path.

* * * * *